Nov. 16, 1937.  H. L. KING ET AL  2,099,119
YEAST MOLDING AND CUTTING MACHINE
Filed March 14, 1935   3 Sheets-Sheet 2

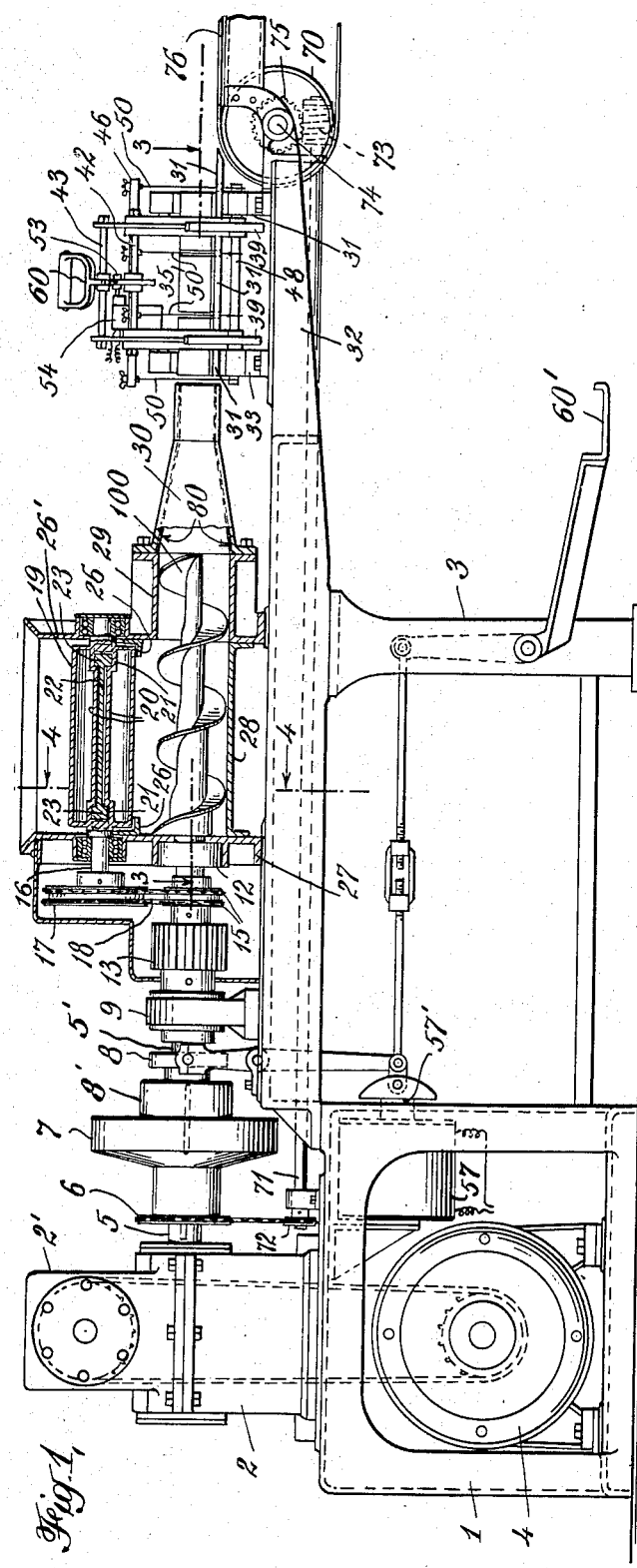

INVENTORS
Harold L. King
Albert Sharp
Karl Schnorr
BY Pennie, Davis, Marvin & Edmonds.
ATTORNEYS

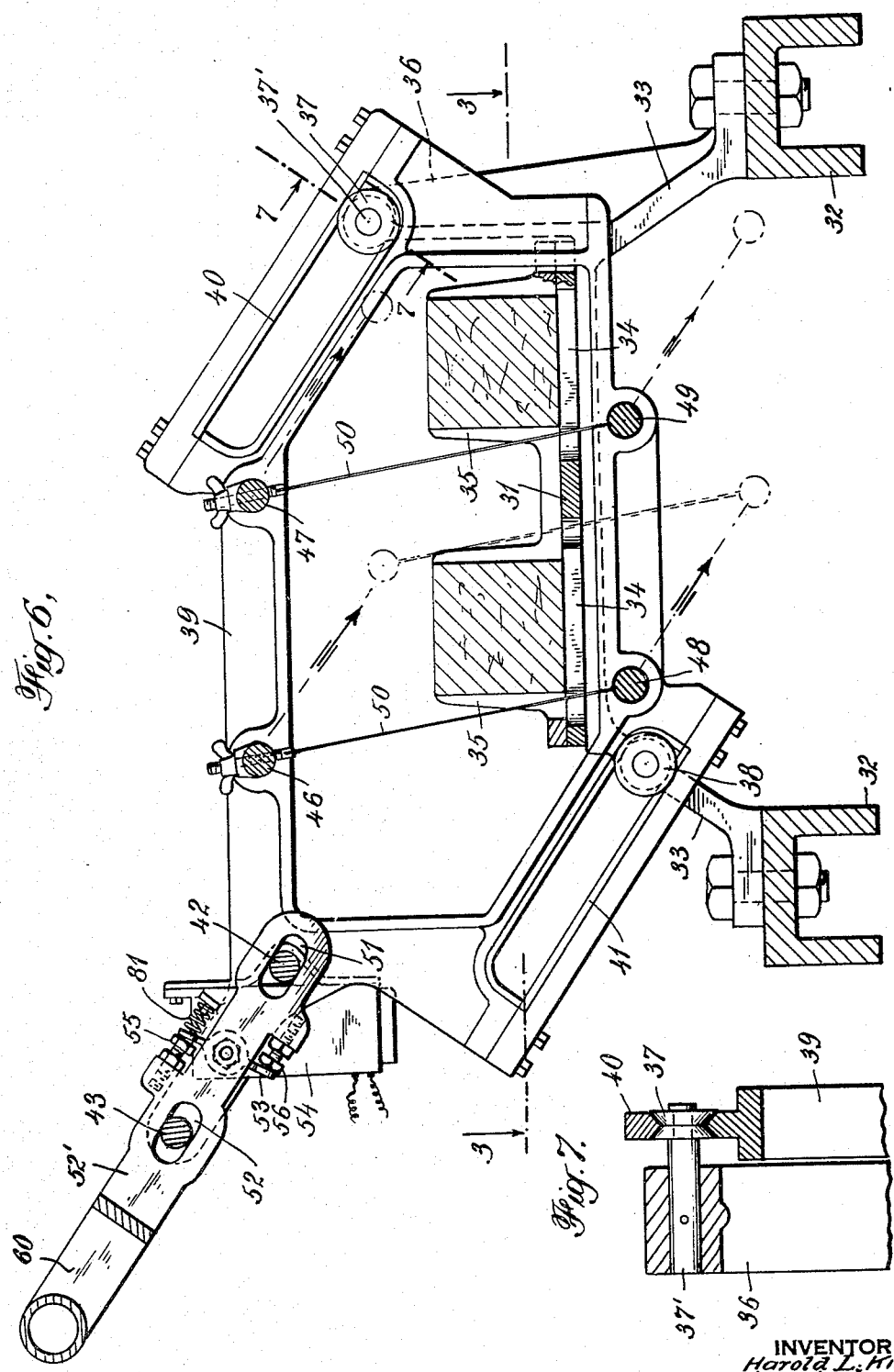

Patented Nov. 16, 1937

2,099,119

UNITED STATES PATENT OFFICE 2,099,119

YEAST MOLDING AND CUTTING MACHINE

Harold L. King, Glen Ridge, Albert Sharp, Bayonne, and Karl Schnorr, Belleville, N. J.

Application March 14, 1935, Serial No. 11,018

11 Claims. (Cl. 107—20)

This invention relates to yeast-handling machines, and its principal object is to provide a machine for shaping and cutting yeast which will generally be of an improved nature, and, in particular, operate considerably faster and turn out more cakes of yeast per minute than previous machines of this nature, while remaining substantially as cheap to build and as simple to operate.

A particular object of the invention is to provide a yeast-handling machine which will have means for forming and cutting a plurality of columns of yeast-cakes simultaneously instead of the usual single line of yeast-cakes.

Another object of the invention is to provide a machine of this kind which though a continuous-feeding machine yet will have means for intermittently stopping the movement of the plurality of yeast-columns, and means for thereupon severing these columns into pats or cakes of a predetermined size.

A still further object is to provide a machine of this nature in which the very initiation of the parceling or severing operation will itself stop the movement of the yeast, so as to permit accurate cutting into exact-size pats without any deformation or waste.

Another object of the invention is to provide a machine for molding cakes of yeast of greatly improved and perfectly homogeneous texture while eliminating concentric rings or layers such as appear in cakes formed by machines now in general use.

Another object of the invention is to provide a mechanism wherein the cutting wires are forced through the yeast with a combined forward and downward motion during the forward stroke and with a combined backward and upward motion during the return stroke, thereby reducing the resistance to the passage of the wire through the material and producing a finer and smoother cut.

It is also an object of the invention to provide an improved method for transforming loose bulk yeast into compact, fixed size cakes or other units, at a considerably greater speed than is at present possible.

A preferred embodiment of the invention is illustrated in the accompanying drawings, and described in detail hereinafter, by way of example; but the inventive concept is limited in its embodiments only by the scope of the subjoined claims. In these drawings, Figure 1 is a side elevation of the machine, partly in section;

Figure 2 is a plan view, also partly in section;

Figure 6 is an enlarged section on line 6—6 of Fig. 2; and

Figure 7 is a section on line 7—7 of Fig. 6.

Figure 3:
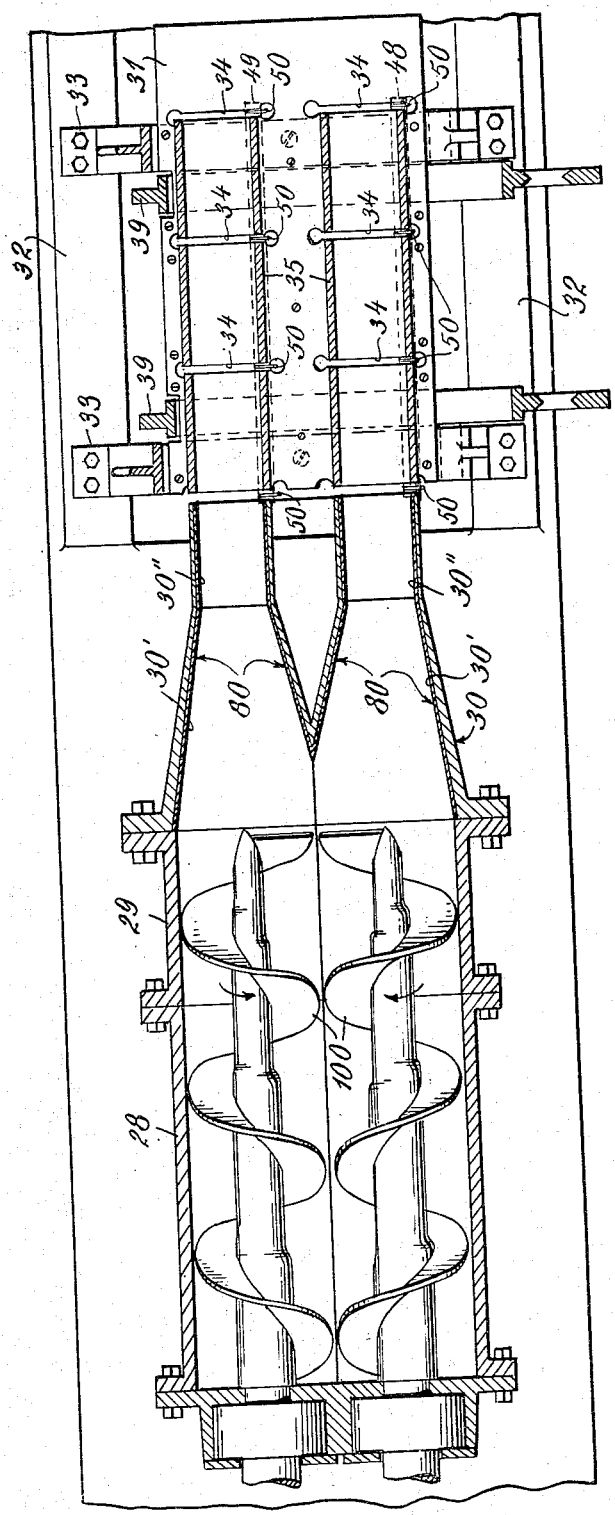
Figure 3 is a detailed fragmentary section, taken along line 3—3 of Fig. 1.
Figure 5:
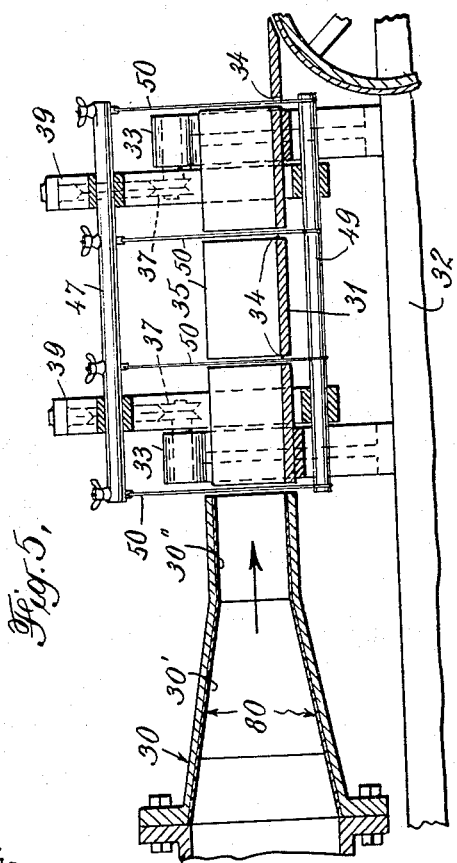
Figure 5 is an enlarged section on line 5—5 of Fig. 2.

The machine illustrated includes a base or frame, here shown as in two general parts, a part 1 for supporting a power transmission mechanism 2, and another, 3, for supporting part of said mechanism and the rest of the machine. A motor 4 is provided and connected to the power transmission mechanism by, preferably, the sprocket-and-chain type of drive shown. The power transmission mechanism also includes a gear reduction set (not shown but located inside the casing 2').

A shaft 5 is driven by the reduction gearing and bears a sprocket wheel 6 rigidly keyed thereto. A clutch member 7 and a complementary member 8' are concentrically mounted respectively on the shaft 5 and the aligned shaft 5' and operate by the internal expanding or other known principle when a clutch operator 8 is actuated in a manner and for purposes hereinafter described.

The shaft 5' passes through a bearing 9, and a countershaft 10 is provided paralleling shaft 5' and mounted in a similar bearing 11 at one end and in a bearing 12 at the other end. The shaft 10 is driven from shaft 5' by means of a spur gear 13 on shaft 5' and a meshing spur gear 14 on shaft 10.

On shaft 5' is rigidly keyed a double sprocket wheel 15. Above shaft 5' and a little outside of it lies a parallel stub shaft 16. The shaft 16, at one end, bears a double sprocket wheel 17. Suitable sprocket chains 18 encircle the sprocket wheels 15 and 17, as shown, in order to establish the drive. A similar sprocket wheel and chain drive is provided between shaft 10 and a second stub shaft 16' arranged above and outside of shaft 10, in a manner similar to that of shaft 5' and shaft 16.

Figure 4:
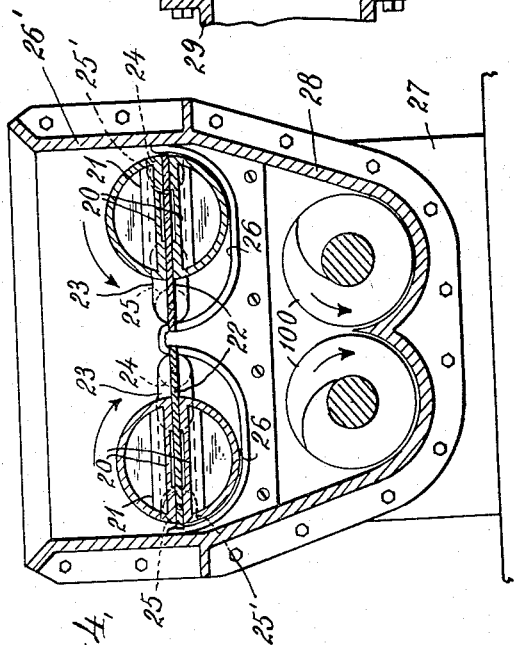
Figure 4 is an enlarged section on line 4—4 of Fig. 1.

Each of shafts 16 and 16' carry a hollow cylinder or drum 19 preferably cast integral with the shaft, but made separate and rigidly attached thereto if desired. Across a diameter of each hollow drum extends an axial compartment or slot defined by two plates 20 integral with the drum and enlarged as at 21 near either end thereof. The compartment extends radially through to the exterior of both sides of the drum, as shown most clearly in Fig. 4. A plate 22 having enlargements 23 at either extremity to prevent longitudinal disengagement is loosely fitted to slide in each slot in the manner shown in Fig. 4. A pair of rollers 24, 25 are provided at each end of each of the plates, and bear when extended on a cam surface 26 provided to extend beneath the rollers and curved as shown in Fig. 4. When retracted, the rollers 24 and 25 fit into recesses 25' in the drums. As the drums rotate oppositely, thus turning toward each other as shown by the arrows in Fig. 4, the plates 22 are gradually pushed out from their extreme inwardly extended positions, shown in Fig. 4, by the cam surfaces 26 acting on the rollers 24. The plates 22 come under and engage the outer edges of overlying loose yeast at the sides of the surrounding hopper 26' and bring it inwardly and downwardly at a gradually increasing speed towards the center of the hopper. The linear speed of the edges of the plates 22 increases due to the fact that the effective length of the plates increases from the position where the outer edges thereof nearly contact the surfaces of the hopper 26', and in this manner, the plates 22 rapidly thrust the yeast down into the lower part of the hopper 26" and into the convolutions of the conveying means, with a definite "slap" or packing and compacting action.

A standard 27 is rigidly mounted on the frame and carries a shell 28 at the base of the hopper 26' carrying the compacting mechanism described above. Two conveyors or feeding screws 100, preferably of the Archimedean form, are mounted by one end in the standard 27 and extend preferably horizontally and in parallelism through the shell 28 in the manner shown best in Fig. 3. These screws are rotated toward each other, as shown by arrows in Fig. 4, and preferably have rather a slow pitch and wide convolutions, being formed to act mainly for conveyance near their bases but doing considerable compressing near their tips. The axis of the screws is preferably stepped or "staged", as shown for reasons of simplicity and economy in design. In order to enable easy access for repair, cleaning, etc., the shell is not continued to the ends of the screws 100 but a smaller separate shell and standard 29 is provided at the screw ends, as shown. The shell 29 serves the purpose of aiding in initiating the definite compacting or compression of the yeast, being smaller in section than the initial shell and lying almost tangent to the screws, thus serving to narrow the path of the yeast considerably. Since the two screws 100 turn inwardly toward each other and lie close together, by the time the yeast passing along these screws has reached the end of shell 29, it has been rid of occluded air and kneaded to a homogeneous texture free from concentric rings or layers such as appear in compressed yeast formed by previously known machines.

Attached to the outer end of the shell 29 is a bifurcated member 30, in the form of two preferably parallel truncated cones 30', each tipped by a short straight duct 30" of rectangular section. The cones 30' receive the partially compressed yeast, conduct it forward under considerable pressure, and gradually squeeze it together, thereby forcing out the occluded air, etc. so that by the time the yeast has reached the ducts 30", it is fully compressed and otherwise in salable condition except for molding it into the final form desired and parceling or dividing it into units of a predetermined size. The yeast forming nozzles comprising the bifurcated member 30, the cones 30' and the straight ducts 30" are preferably lined with a material which acts as a lubricant or otherwise to reduce the friction between the nozzles and the yeast passing therethrough. This lining may comprise a layer of wax, or a smooth layer of glass, enamel, Bakelite or like material, as indicated at 80.

In the ducts 30" the yeast is extruded into two parallel, spaced, rectangular bars, here shown as approximately square in cross section and moving forward at equal speeds.

A horizontal plate 31 is provided on the base 3, just under the moving yeast in order to support same while it is being divided, and the plate is attached to inverted channels 32 on the base 3 by legs 33 integral with the plate. The plate 31 bears a series of slots 34 extending transversely of the path of the yeast and across two channel members 35, which are in effect open-topped, non-compressing continuations of ducts 30". The legs 33 have two vertical extensions 36 at one side and each of these extensions bears a roller 37 mounted on a stub shaft 37'. Another roller 38 is provided on the legs 33 at the other side of the channel members 35, as best shown in Fig. 6. Two longitudinally spaced frames 39 interconnected into a box frame are mounted to slide on the rollers 37 and 38 by means of yokes 40 and 41 embracing these rollers, as shown in Fig. 6. The box frame can be bodily rolled or slid on the rollers, obliquely downward and to the right as a whole across the path of the yeast into the position shown in dotted lines in Fig. 6. The frames 39 are connected by tie rods 42 and 43.

Two other rods 46 and 47 extend transversely of the lower part of the frame, beneath plate 31, and are connected to the upper parallel rods 48 and 49 by tensioned cutting members, here shown as thin round wires 50. There are four of these wires 50 connecting rods 46 and 48 and arranged in slanting parallelism as shown in Fig. 6; and four similarly disposed wires 50 connecting rods 47 and 49. Wing nuts and screws are arranged as shown so as to take up slack and increase the tension on the wires 50 when desired. When the cutter frame is moved downwardly and to the right as shown in Fig. 6, the wires 50 move through the slots 34 in the channels 35 and plate 31, downwardly of and across the channels 35 and parallel to their original slanting positions, into the lower positions shown in dotted lines.

Mounted on the tie rods 42 and 43 by slots 51 and 52 in the plate 52' is a cutter operating handle 60. The handle can slide relative to the frame to a limited extent when pushed diagonally to cut the yeast. A switch 54 is strap mounted on rod 42 of the frame in such a way as to place its rocking operating bar 53 intermediate, and in juxtaposition to, the oppositely disposed studs 55 and 56 fixed to the handle plate 52'. Suitable means such as the compressed coiled spring 81 is provided to bias the switch operating bar 53 in a counter-clockwise direction to its circuit opening position as shown in Fig. 6. With the bar 53 in this position, the operating handle 60 is in a central or neutral position with respect to the tie rods 42 and 43, these rods being centrally disposed respectively in the slots 51 and 52. When the handle 60 is pushed inwardly and downwardly, the stud 55 turns the switch operating bar 53 in a clockwise direction to its circuit closing position. The switch 54 is connected to control the supply of current from a suitable source to a solenoid 57 mounted on the base 1. When the switch 54 is thus closed, the core 57' of the solenoid 57 is drawn in, resulting in actuating the connected clutch lever 8 to throw the clutch out of engagement and thus stop the forward movement of the yeast. Continued pressure on the handle 60 actuates the cutter frame and the now stationary yeast columns are severed at one stroke into a plurality of cakes, here shown as six in number. After the downward cake severing movement, the handle 60 is released and the switch operating bar 53 is moved in a counter-clockwise direction by a spring 81 thereby moving the handle 60 to its central or neutral position and opening the circuit through the switch 54. The solenoid 67 is thus deenergized, the clutch is reengaged by spring or other means, and the yeast again starts moving forward. The handle 60 remains in its lower position with the cutting wires 50 to the right of the extruded yeast columns, as viewed in Fig. 6, until sufficient yeast has been extruded to form six additional cakes. At this point, the handle 60 is pulled upwardly and to the left, as viewed in Fig. 6. The initial movement of the handle 60 turns the switch operating bar 53 through the stud 56 in a clockwise direction to the circuit closing position, thus opening the clutch through the action of the solenoid 57 and stopping the forward movement of the yeast. Continued upward movement of the handle 60 carries the wires 50 in a diagonal upward direction through the extruded yeast columns, severing them into cakes. When the handle 60 is released in the upper position, the switch bar 53 moves to its circuit opening position, placing the handle 60 in the neutral position, whereupon the clutch is reengaged and the extrusion of the yeast columns continues.

The base also carries a foot pedal 60' mounted as shown for use in place of the electric mechanism on the cutter handle, if desired or necessary.

The base 3, at its extreme end, carries a belt pulley 70 between the sides of the base and driven by a shaft 71. The shaft 71 is driven from sprocket wheel 6 and shaft 5 by means of sprocket 72 on shaft 71. The shaft 71 has a worm drive 73 on its outer end, and a shaft 74, on which pulley 70 is mounted, bears a cooperating worm wheel 75. A belt conveyor 76 is carried on the pulley 70 and runs to the right from the extreme end of plate 31.

In operating the machine, loose yeast is poured into the hopper 26' and the outer edges of the two paddle-plates 22 engage it near the sides of the upper part of the hopper and bring it at an increasing speed toward the center and downwardly into the convolutions of the screw conveyors 100. These feed it forward in the form of two parallel "ropes", helices or twists and the conical nozzles 30 straighten out the ropes into a more or less cylindrical shape and finish their compression. The nozzles 30 then pass the compressed yeast into the square section cake-formers 30", and when, say, about two feet of the parallel lines has been extruded from these, the operator pushes down on the cutter handle 60, primarily thereby stopping the movement of the yeast. He finishes his push with a sudden rapid thrust, and the yeast is severed into six equal size cakes without crumbling, "tearing" or otherwise disintegrating the molded yeast. Upon releasing the cutter handle 60, the forward feeding of the yeast starts again and the now completely formed cakes are pushed onto the belt conveyor whereby they are conveyed to a wrapping or other machine. When another two feet, say, of yeast has been fed onto plate 31, the cutter frame is pulled upwardly by the handle 60, thus severing six more cakes, and this operation is repeated at proper intervals. The speed of operation is considerably greater than that heretofore obtainable.

By means of the oblique downward and upward motion of the cutter as a whole, with the wires 50 at an angle to the path of movement of the frame, the yeast streams, instead of being subjected to a sundering or tearing-apart stress, are subjected to a direct shearing action, which produces a fine smooth cut surface and avoids dripping off flakes of yeast at the corners of the columns. There is practically no tearing or breaking of the material even though friable, and waste of the expensive yeast is reduced to a minimum.

We claim:

1. A plastic-handling machine, comprising means for receiving loose plastic, means for conveying and compressing same, means for dividing the compressed plastic, and means independent of the movement of the plastic but cognate with the dividing means for automatically stopping the conveying-means before dividing the plastic.

2. In a machine of the class described, passageways for a plurality of moving streams of treated plastic, said passageways having apertures extending transversely thereof, a severing member movable across said apertures to sever the plastic and having a handle, and means on the severing member for stopping the movement of the plastic and cutting the stationary plastic streams into portions of a predetermined size.

3. In a machine of the class described, means for feeding material, means for dividing same, and means independent of the movement of the plastic but cognate with the dividing means for stopping the feed prior to the dividing operation.

4. In a machine of the class described, means for feeding material, a movable cutter framework for dividing same, and a movable handle on said framework for stopping the feed and operating the cutter.

5. In a machine of the class described, means for feeding material, a movable cutter framework for dividing same, a movable handle on said framework, and means whereby the initial movements of the handle stop the feed and further movements thereof divide the material.

6. In a machine of the class described, means for feeding material, a movable cutter frame for dividing same, a handle movable to a limited extent in said frame, a switch for controlling the feed, and means whereby initial movement of the handle in said frame closes said switch, further movement operates the cutter frame, and release of said handle closes said switch.

7. In a machine of the class described and having a path for movable material, a framework displaceable and translatable bodily across said path and including spaced members in different planes, tensile-members extending therebetween, and means for moving the framework to cause said tensile members to bodily traverse the path of said material.

8. In a machine of the class described, a channel for material, a movable framework including spaced members in different planes, tensile-members connecting same in the vertical plane, and means for moving said framework parallel to itself with a combined forward and downward motion, and upward and backward motion on the up-stroke to cause said tensile-members to traverse the path of said material with a finer and smoother cut than otherwise.

9. In a machine of the class described, a channel for material, a framework including transverse members in different planes, and tensile-members connecting said members in a substantially vertical plane, said tensile-members slanting backwardly from the vertical and being adjustable as to tension.

10. In a machine of the class described, a rectangular channel for carrying extruded plastic material, a framework bodily displaceable and translatable transversely of said channel in a path at an angle to the walls of said channel, cutting members carried by said framework and disposed at an angle to the path of movement of said framework and at an angle to the walls of said channel, and means for moving said framework to cause said cutting members to traverse said channel.

11. In a yeast handling machine of the character described, means for receiving yeast in a loose plastic condition, a planar-member therebeneath, and means for causing the outer edge of said planar-member to come under and engage the outer edge-regions of said yeast and bring it at a gradually increasing angular velocity towards the center.

HAROLD L. KING.
ALBERT SHARP.
KARL SCHNORR.